June 9, 1964     W. B. CLARKE ETAL     3,136,889
APPARATUS FOR DETERMINING GAMMA OR X-RAY DOSAGE
Filed Dec. 6, 1961     2 Sheets-Sheet 1

WINSTON B. CLARKE
ROBERT J. MELTZER
INVENTORS

ATTORNEYS

WINSTON B. CLARKE
ROBERT J. MELTZER
INVENTORS

United States Patent Office 3,136,889
Patented June 9, 1964

3,136,889
APPARATUS FOR DETERMINING GAMMA
OR X-RAY DOSAGE
Winston B. Clarke, Webster, and Robert J. Meltzer,
Irondequoit, N.Y., assignors to Bausch & Lomb Incorporated, Rochester, N.Y., a corporation of New York
Filed Dec. 6, 1961, Ser. No. 157,368
5 Claims. (Cl. 250—71.5)

This invention relates to a method and apparatus for determining the dosage of ionizing radiation to which a body has been exposed, and more particularly to a method and apparatus for separating post dose fluorescence from any pre-dose fluorescence and indicating the intensity of the separate post dose fluorescence.

Particularly in the field of radiation dosimetry, it is desirable to quantitatively determine the dosage of gamma or X-rays to which a body has been exposed. Generally, there is a maximum dosage to which individuals may safely be exposed in any period of time. Accordingly, radiation sensitive devices are available which indicate the summation effect of repeated exposures.

Instruments known as fluorometers or fluorophotometers are used for measuring the amount of fluorescence emitted by test objects under various analytical procedures. Instruments of this type are used to determine quantitatively the integrated dosage of gamma or X-rays to which a body has been exposed. For example, a silver phosphate glass object is subjected to ultraviolet light to produce fluorescence. The fluorescence is measured by a fluorometer to indicate the integrated dosage of gamma or X-rays to which the body has been subjected.

The sensitivity of conventional fluorometers in indicating integrated gamma ray dosage is limited by the natural fluorescence inherent in a silver phosphate glass object. This inherent fluorescence of glass object is referred to hereinafter as pre-dose fluorescence. The pre-dose fluorescence must be significantly exceeded by the integrated X-ray or gamma ray dosage in order to determine the dosage to which the body has been subjected. Accordingly, a body may be subjected to low level radiation i.e. relatively small doses of gamma or X-rays for a relatively long time before the effect is detected. It is desirable, therefor, to have a method and apparatus for detecting the effects of low level radiation and to overcome the problem caused by pre-dose fluorescence.

The present invention is based upon the differences in the fluorescence decay time constants of a test object. The fluorescence decay time constants of unexposed dosimeter glass and irradiated dosimeter glass are significantly different. The fluorescence attributed to changes in the dosimeter material caused by irradiation is referred to hereinabove and hereinafter as post dose fluorescence. The present method is suitable for detecting low-level doses of gamma or X-rays using a dosimeter glass object such as a silver phosphate glass object. Separating the two components and measuring the post dose component overcomes to a high degree the problem associated with pre-dose fluorescence.

Apparatus for indicating the pulse decay rates of irradiated samples may include means to sinusoidally modulate the intensity of the excitation source at a relatively high frequency. Means are also included to measure the phase lag between the excitation and the emission. The frequency of modulation in this type of system should be in the range of 1 to 10 megacycles per second. A system for providing a frequency of modulation between 1 and 10 megacycles per second is relatively complex and expensive.

Apparatus according to the presently preferred embodiment of the invention is relatively simple and relatively inexpensive. The apparatus includes means for generating a short pulse of ultraviolet excitation. The excitation in the preferred embodiment has relatively high intensity and a spectral output primarily in the range of 300 to 400 millimicrons.

Since fluorescence lifetimes are approximately $10^{-5}$ to $10^{-8}$ seconds, the excitation pulse decay should preferably be about $10^{-8}$ seconds.

Various types of flash lamps have been used to generate the excitation pulse, for example, xenon, mercury and hydrogen lamps. Xenon, mercury and hydrogen lamps have unsatisfactory cutoff characteristics caused by comparatively long ion recombination time. For example, a graphical representation of intensity versus time indicates a slowly decaying tail. Flash lamps having satisfactory cutoff characteristics generally have inadequate intensity for the present purpose. In order to overcome this problem the present invention contemplates optically generating the excitation pulse. Optically generating the pulse and incorporating a hydrogen filled lamp overcomes the aforementioned problem. The pulse may be generated by a rotating mirror.

Briefly, the present invention contemplates a method for determining the dosage of ionizing radiation to which a body has been exposed comprising exciting a body to a fluorescent state, and separating post dose fluorescence and pre-dose fluorescence with respect to time. The fluorescences are distinguished from each other by differences in their respective decay times and the intensity of the separate post dose fluorescence is indicated. Since fluorescence intensity is a function of time, the two components may be separated with respect to time.

For practical purposes the sample comprises a silver phosphate glass body. The test object may comprise any radio luminescent material having an excitation pulse decay which changes upon radiation. The decay time constants for silver phosphate are significantly different for an irradiated sample and for unexposed sample. The fluorescence lifetime of an irradiated sample has been found to be approximately $3.5 \pm .3$ microseconds, while a non-irradiated sample has a decay time constant of less than .5 microsecond.

Apparatus for indicating X-ray or gamma ray dosage according to the present invention includes a source of light adapted to direct light rays onto a rotatable mirror. The mirror is adapted to rotate at a relatively high speed, for example, 1800 revolutions per minute to thereby cause an image of the light source to traverse a sample at a repetition rate of approximately 30 pulses per second. This arrangement is effective to produce a pulse of light.

The light pulse produced by the novel arrangement has desirable cutoff characteristics. For example, if the pulse is shown as a graphical plot of intensity versus time the plot will define an isosceles triangle. The excitation pulse is controlled by the geometry of the optical system. This novel arrangement overcomes to a high degree the problem associated with unsatisfactory decay rates of lamps.

The invention will now be described in more detail in connection with the accompanying drawings; in which, FIGURE 1 is a schematic illustration of apparatus according to the present invention for indicating the dosage of gamma or X-rays to which a body has been exposed;

Figure 1:
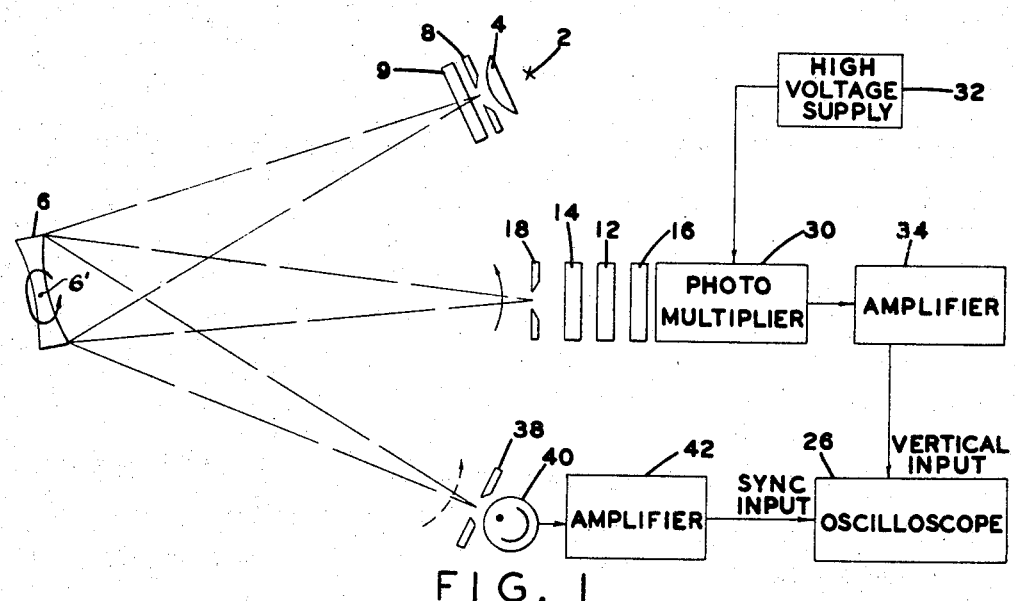

A light source 2 according to the preferred embodiment of the invention comprises a high pressure short arc mercury lamp of the type having a fused silica envelope. A lamp of this type is preferred since it has relatively high transmission in the ultraviolet region of the spectrum.

The apparatus according to the presently preferred embodiment of the invention also includes a quartz condenser lens 4 having about a 15 millimeter focal length. The lens 4 directs light rays from the lamp onto a rotatable spherical mirror 6. A slit 8 approximately 1 mm. x 10 mm. is placed in front of the condenser 4 and illuminated by the lamp 2. The slit 8 is imaged by the mirror 6 at an image plane which includes a second slit 18.

A test object 12 placed between an ultraviolet pass filter 14 and a non-fluorescent ultraviolet absorption filter 16, is placed in back of the slit 18. Since the focal length of the mirror 6 is approximately one half meter, the optical distance from the source to the sample is approximately 1 meter. The focal length of the mirror, the size of the slits and optical components are set forth as an example of the presently preferred embodiment, however, they may be changed substantially without departing from the scope of the invention.

It may also be desirable to include an ultraviolet filter 9 which transmits ultraviolet light between 300 and 400 millimicrons wave lengths in front of the slit 8. The filter 9 removes about 2 percent of red light which would normally pass through the filter 14. Two filters reduce the light intensity to about 10 percent, however, such loss is more than compensated for by reducing the red light to a negligible amount.

A photomultiplier 30 with an associated high voltage supply 32 converts the light pulse to an electric pulse and provides the requisite current gain. A voltage drop is developed across the photomultiplier's load resistor (not shown) by the photomultiplier anode current. The resultant voltage is amplified by the amplifier 34. The output of the amplifier 34 is connected to the vertical axis input of an oscilloscope 26.

A slit 38 generally similar to the slit 18 and a photo tube 40 is arranged so that the light pulse strikes the photo tube 40 approximately 100 microseconds prior to striking the sample 12. The output of the photo tube 40 is amplified by the amplifier 42. The output of the amplifier 42 is connected to the external sweep trigger input of the oscilloscope 26. This arrangement is effective to synchronize the horizontal sweep of the oscilloscope 26 with the scan of the excitation pulse. The total variation on the time axis of the oscilloscope is less than .25 microsecond. If more positive synchronization is desired the time lapse could be reduced by placing the photo tube 40 closer to the photomultiplier 30.

The mirror 6 is driven by any suitable means such as the motor 5 by means of the shaft 6'. The back surface of the mirror is generally similar to the front surface and is coated with an anti-reflective coating. The back surface is curved in order to facilitate balancing the rotatable assembly. In some cases it may be desirable to omit the anti-reflective coating. For practical purposes it has been found relatively difficult to utilize both surfaces of the mirror 6. The difficulty resides in obtaining identical surfaces and in mounting the mirror according to optical tolerances with the axis of rotation midway between the two surfaces.

Figure 2:
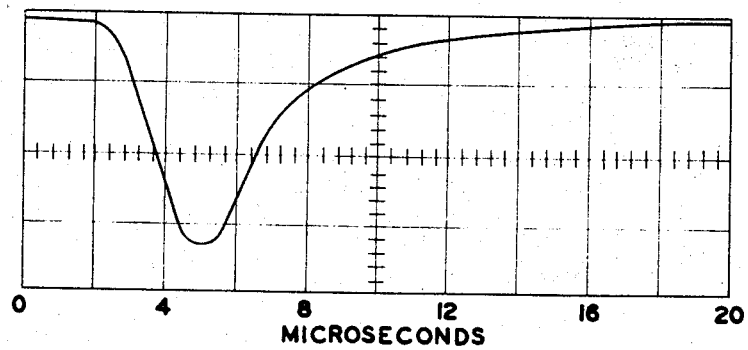
FIG. 2 illustrates an oscillogram of the fluorescence decay of an irradiated sample of silver phosphate glass.

FIG. 2 illustrates an oscillogram obtained on apparatus according to the present invention. The oscillogram represents the results obtained from a silver phosphate glass sample which has been subjected to gamma or X-rays. This illustrates post dose fluorescence. In the oscillogram the vertical axis sensitivity corresponds to a photo-multiplier current of .1 milliamp per centimeter.

Figure 3:
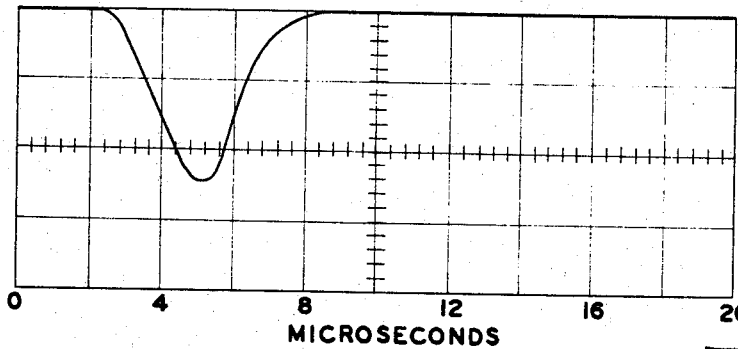
FIG. 3 illustrates an oscillogram of the fluorescence decay of a silver phosphate glass sample which has not been subjected to radiation.

FIG. 3 is generally similar to FIG. 2 but illustrates an oscillogram for a silver phosphate glass sample which has not been subjected to radiation. This illustrates pre-dose fluorescence.

Figure 4:
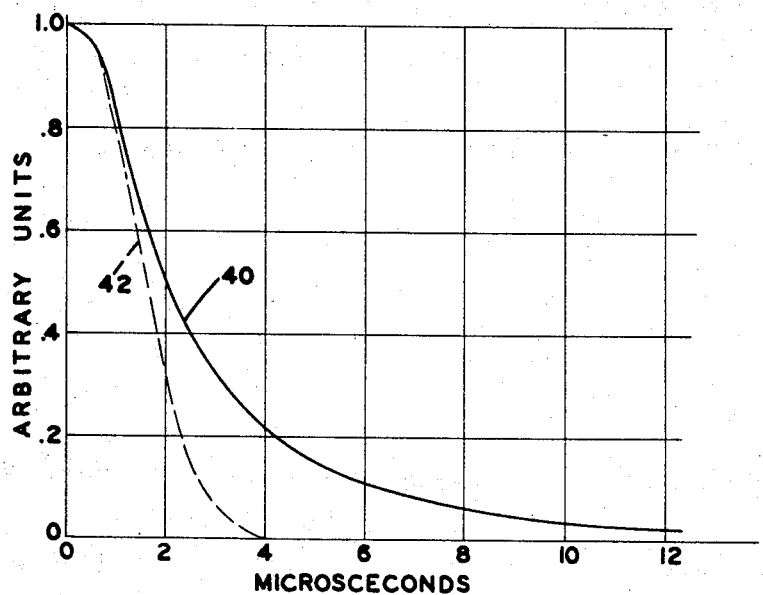
FIG. 4 is a graphic representation showing the difference between the excitation pulse and the fluorescence decay of an irradiated sample.

A graphic representation of the pulse shape shown in FIG. 2 is illustrated in FIG. 4. The portion of the pulse after the fluorescence peak is illustrated by the solid line 40. For comparison purposes a dotted line 42 indicates the shape of the excitation pulse. The half width of the excitation pulse is approximately 3 microseconds. At approximately 4 microseconds, when the excitation ceases the fluorescence caused by irradiation of the sample is still approximately 25 percent of its peak value. The time requirement to decay to 36 percent of this value i.e. the time constant, is approximately 3.5 microseconds.

Figure 5:
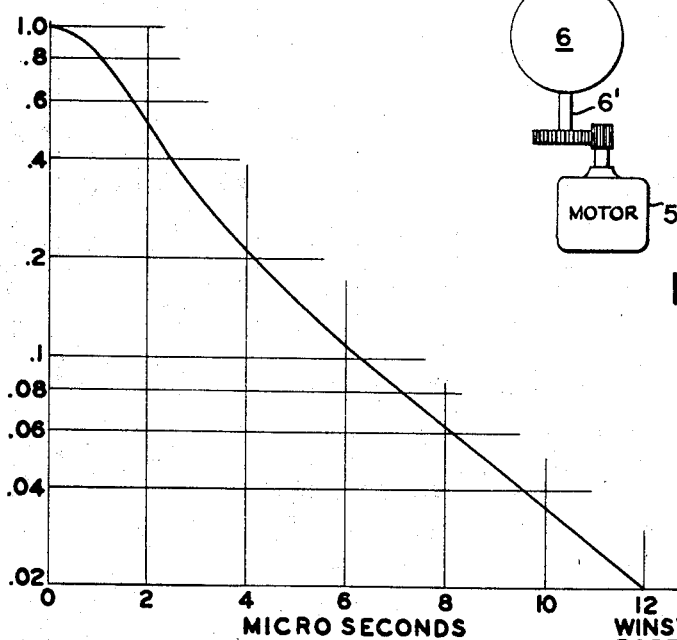
FIG. 5 is a graphic illustration of the logarithms of light intensity versus time; and, FIG. 6 is a schematic view showing a motor, shaft and mirror assembly for modulating the light intensity.
Figure 6:
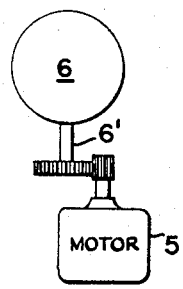

The time constant may be more readily indicated by a plotting the logarithm of the amplitude in FIG. 4 versus time. Time in this case is plotted on a linear scale. The resulting "semilog" graph is shown in FIG. 5.

What is claimed is:

1. Apparatus for determining the dosage of ionizing radiation to which a body has been exposed, comprising a light source adapted to direct light rays onto said body, means to modulate the intensity of the light source at a relatively high frequency to thereby excite said body to a fluorescent state, means to separate the post dose fluorescence and the pre-dose fluorescence and means to measure the intensity of the post dose fluorescence.

2. Apparatus for determining the dosage of ionizing radiation to which a body has been exposed, comprising a rotatable mirror and a source of light adapted to direct light rays onto said rotatable mirror, said rotatable mirror being adapted to rotate at a relatively high speed to thereby cause an image of a light source to traverse said body for exciting said body to a fluorescent state, means for separating the pre-dose and post dose fluorescence and means to measure the intensity of the post dose fluorescence.

3. Apparatus for determining the dosage of ionizing radiation to which a sample has been exposed, comprising a rotatable mirror and a source of light adapted to direct light rays onto said rotatable mirror, said rotatable mirror being adapted to rotate at a relatively high speed to thereby cause an image of said light source to traverse said sample, a photomultiplier and a high voltage supply for providing the requisite current gain for said photomultiplier, an oscilloscope and an amplifier for amplifying the electrical output of said photomultiplier and feeding an amplified signal into said oscilloscope to thereby indicate the signal produced by said light pulse, and a second amplifier and a photo tube connected to said second amplifier, the output of said second amplifier being connected to said oscilloscope to synchronize the horizontal sweep of the oscilloscope with the scan of the excitation pulse whereby the oscilloscope will indicate the emission pulse decay of said sample to thereby determine post dose fluorescence.

4. Apparatus for determining the gamma or X-rays to which a body has been exposed, according to claim 3, in which, the means including the light source comprises a short arc mercury lamp and an ultraviolet filter, said filter being effective to transmit ultraviolet in the spectral range of approximately 300 to 400 millimicrons; and an ultraviolet pass filter and a non-fluorescent ultraviolet absorption filter placed between the mirror and the photomultiplier.

5. Apparatus for determining the gamma or X-rays to which a body has been exposed, according to claim 4, in which, the photo tube is placed adjacent the photomultiplier and at a distance therefrom so that the light pulse strikes the photo tube approximately 100 microseconds prior to striking the sample.

References Cited in the file of this patent
UNITED STATES PATENTS
2,934,651    Etzel et al. _____ Apr. 26, 1960